J. J. HOGAN.
SHAFT COUPLING.
APPLICATION FILED JAN. 25, 1912.
1,166,835.
Patented Jan. 4, 1916.
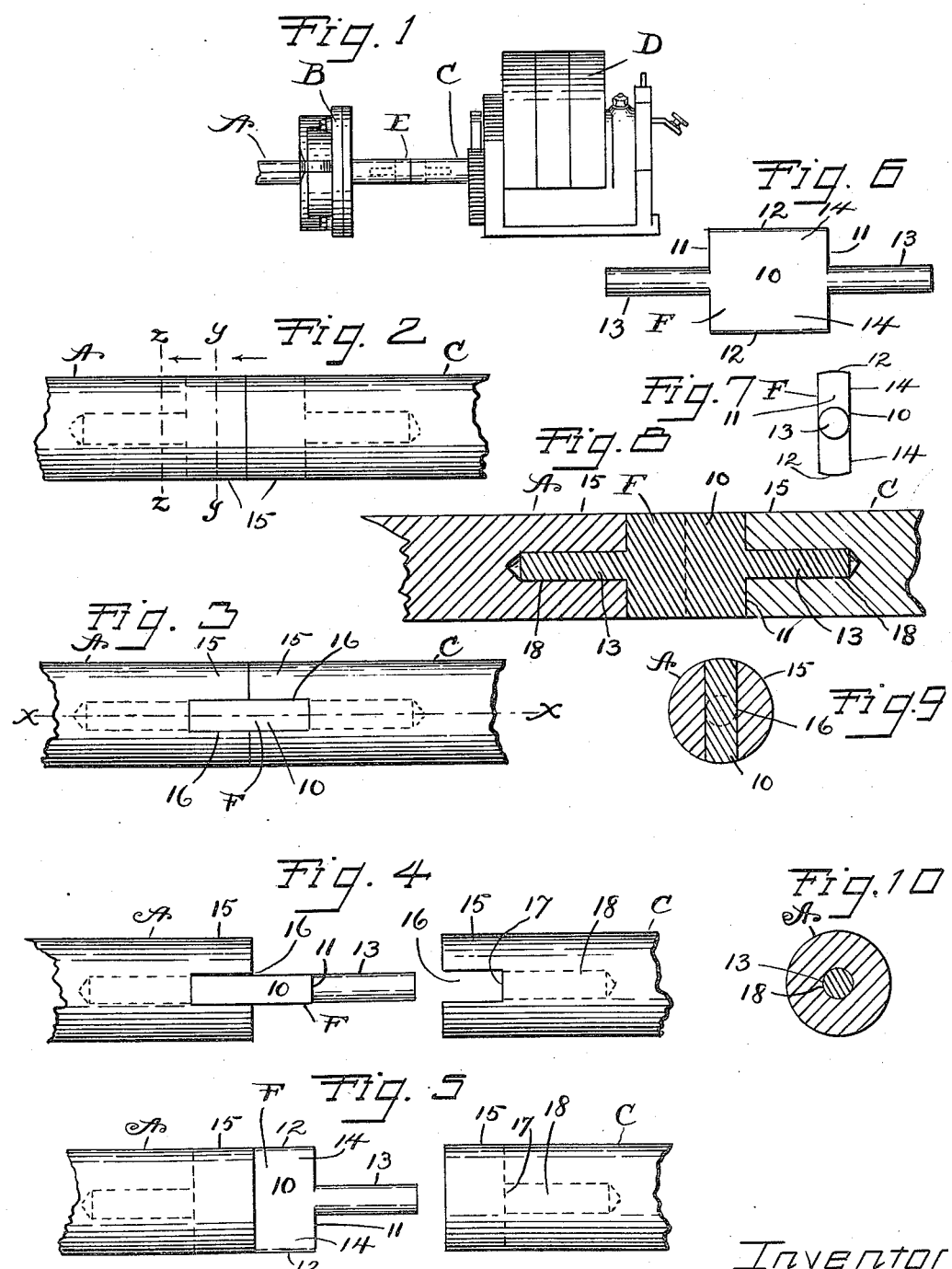

UNITED STATES PATENT OFFICE.

JOHN J. HOGAN, OF WEST HAVEN, CONNECTICUT, ASSIGNOR TO JOSEPH E. HUBINGER, OF NEW HAVEN, CONNECTICUT.

SHAFT-COUPLING.

1,166,835.   Specification of Letters Patent.   Patented Jan. 4, 1916.

Application filed January 25, 1912.   Serial No. 673,478.

*To all whom it may concern:*

Be it known that I, JOHN J. HOGAN, a citizen of the United States, residing at West Haven, in the county of New Haven and State of Connecticut, have invented certain new and useful Improvements in Shaft-Couplings, of which the following is a specification.

My invention relates to improvements in shaft couplings, and the object of my improvement is to produce a shaft coupling that is suitable for use with the auxiliary shaft of an internal combustion or automobile engine for operatively connecting the magneto thereto and that will serve to do this in a manner that is safe, convenient and reliable, and will permit of readily connecting and disconnecting the magneto.

In the accompanying drawing:—Figure 1 is a side elevation of a part of an auxiliary shaft of an automobile engine and the water pump operated therefrom on one side and the magneto on the other side and my coupling operatively connecting the magneto to the shaft. Fig. 2 is a similar view of the coupling on an enlarged scale. Fig. 3 is a plan view of the same. Fig. 4 is a similar view of the same with the shaft ends uncoupled. Fig. 5 is a side elevation of the parts shown in Fig. 4 and in the same position. Fig. 6 is a side elevation of the coupling piece. Fig. 7 is an end view of the same. Fig. 8 is a sectional view on the line *x x* of Fig. 3. Fig. 9 is a sectional view on the line *y y* of Fig. 2. Fig. 10 is a sectional view on the line *z z* of Fig. 2.

A is the auxiliary shaft of an automobile engine of the internal combustion type and the same has devices essentially permanently operatively mounted thereon, such as the water pump B and has the shaft C of the magneto D removably connected thereto by means of my improved coupling E.

In the use of my coupling E the ends of the shafts A and C are brought into abutment in axial alinement and they are coupled together by means of a coupling piece F.

The coupling piece F comprises a body portion 10 having a plate-like structure of appreciable thickness essentially rectangular in formation, having squared ends 11 and the outer sides 12 rounded concentric with the axis of the shaft, and a pair of end guide pins 13 extending axially from the ends 11, cylindrical in shape, and preferably of diameter the same as the thickness of the body portion 10. The coupling piece F may be regarded as a cylindrical shaft 13 provided along the middle of the length with oppositely extending radial wings 14.

The shaft ends 15 are each provided with a diametral slot 16 that is a fit for the body portion 10 of the coupling piece F and suitable to receive about one half the length thereof, and extending axially from the inner wall 17 of the said slot 16 there is a hole or bore 18 that is a fit for the guide pin 13. Accordingly, the shaft ends 15 each receives and houses about one half of the coupling piece F. When the shafts are together and the coupling piece in position under normal conditions of usage, and as mentioned, the shaft ends may be in abutment under these conditions.

The body portion 10 and pin 13 of the coupling piece F serve to separably connect the magneto to the auxiliary shaft.

The guide pins 13, engage with the bores 18 and serve to position the shafts A and C in axial alinement and the wings 14 or body portions 10 serve to rotatively connect the said two shafts.

My coupling as described is simple in construction, easily made, both as applied to the coupling piece and providing the means in the ends of the shafts to receive the same, is efficient, and reliable and avoids free and loose pieces that are liable to drop out and become lost or misplaced.

I claim as my invention:—

The combination of two alined shafts having diametrical slots and axial holes at their opposed ends, with a shaft coupling therefor, said coupling comprising a rectangular plate having axial guide pins extending from the ends thereof of a diameter substantially equal to the thickness of the plate, the plate fitting into the diametrical slots in the shafts and the pins fitting into the axial holes in the shafts.

JOHN J. HOGAN.

Witnesses:
 J. E. HUBINGER, Jr.,
 BENJ. P. GREENE.